United States Patent

Marchon

[11] Patent Number: 6,130,807
[45] Date of Patent: Oct. 10, 2000

[54] INFORMATION STORAGE DISC HAVING A CURVED DISC SURFACE

[75] Inventor: Bruno J. Marchon, Palo Alto, Calif.

[73] Assignee: Seagate Technology LLC, Scotts Valley, Calif.

[21] Appl. No.: 09/084,490

[22] Filed: May 26, 1998

Related U.S. Application Data

[60] Provisional application No. 60/067,587, Dec. 5, 1997.

[51] Int. Cl.[7] .................................................... G11B 5/82
[52] U.S. Cl. ............................................................. 360/135
[58] Field of Search ...................................... 360/130, 133, 360/135, 102, 224; 369/272, 280

[56] References Cited

U.S. PATENT DOCUMENTS

| | | | |
|---|---|---|---|
| 3,967,320 | 6/1976 | Fell | 360/102 |
| 4,069,508 | 1/1978 | Bilek | 360/135 |
| 4,208,683 | 6/1980 | Kleczkowski | 360/135 |
| 4,376,960 | 3/1983 | Karol | 360/99.01 |
| 4,823,215 | 4/1989 | DeMoss et al. | 360/98.02 |
| 4,974,106 | 11/1990 | White et al. | 360/102 |
| 5,140,480 | 8/1992 | DeMoss | 360/102 |
| 5,233,597 | 8/1993 | Nakayama et al. | 369/280 |

FOREIGN PATENT DOCUMENTS

| | | | |
|---|---|---|---|
| 52-52602 | 4/1977 | Japan | 369/280 |
| 57-64331 | 4/1982 | Japan | 360/135 |
| 7-220261 | 8/1995 | Japan . | |

OTHER PUBLICATIONS

H.J. Lee, R. Hempstead, and J. Weiss, "Study of Head and Disc Interface in Contact Start Stop Test", *IEEE Trans. Magn.*, vol. 25, No. 5, p. 3722 (1989).

J.K. Lee, J. Enguero, M. Smallen, A. Chao, "The Influence of Head Parameters on Take–Off Velocity", *IEEE Trans. Magn.*, vol. 26, No. 6, p. 3915 (Nov. 1993).

*Primary Examiner*—David L. Ometz
*Attorney, Agent, or Firm*—Joseph R. Kelly; Westman, Champlin & Kelly, P.A.

[57] ABSTRACT

A disc is used for recording information in a disc drive. The disc includes a data storage surface defined by a periphery. The data storage surface is curved to reduce stiction and improve slider dynamics.

18 Claims, 4 Drawing Sheets

INFORMATION STORAGE DISC HAVING A CURVED DISC SURFACE

REFERENCE TO RELATED APPLICATION

The present application claims priority from U.S. provisional application Ser. No. 60/067,587 filed on Dec. 5, 1997.

BACKGROUND OF THE INVENTION

The present invention deals with disc drives. More particularly, the present invention deals with a disc in a disc drive having a disc surface which is shaped to improve stiction and slider dynamics in the disc drive.

Different types of disc drives are well known in the industry. Such drives typically include discs which have at least one storage surface for storing digital information in a plurality of circular, concentric data tracks. The discs are mounted on a spindle motor which causes the discs to rotate, and the surfaces of the discs pass under respective head gimbal assemblies (HGAs). The head gimbal assemblies carry transducers which write information to and read information from the disc surfaces. An actuator mechanism moves the head gimbal assemblies from track to track across the surfaces of the discs under control of electronic circuitry. The actuator mechanism includes a track accessing arm and load beam for each head gimbal assembly. The load beam provides a preload force which urges the head gimbal assembly toward the disc surface.

The head gimbal assembly includes a hydrodynamic bearing slider and a gimbal. The gimbal is positioned between the slider and the load beam to provide a resilient connection that allows the slider to pitch and roll while following the topography of the disc. The slider includes a slider body having an air bearing surface which faces the disc surface. As the disc rotates, the disc drags air under the slider along the air bearing surface in the direction approximately parallel to the tangential velocity of the disc. Skin friction on the air bearing surface causes the air pressure between the disc and the air bearing surface to increase which creates a hydrodynamic lifting force that causes the slider to lift off of the disc surface and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc. The transducer is typically mounted at or near the trailing edge of the slider.

Flying height (the distance at which the slider flies above the disc surface) is viewed as a critical parameter of contact and non-contact recording. As the average flying height of the slider decreases, the transducer achieves greater resolution between the individual data bit locations of the disc. Therefore, it is desirable to have the transducers fly as close to the disc as possible. Flying height is preferably uniform regardless of variable flying conditions, such as tangential velocity variation from inside to outside tracks on the disc surface, lateral slider movement during seek operations, and air bearing skew angles.

In certain applications, it is desirable to fabricate the slider such that the bearing surface has a positive curvature along the length and width of the slider. Length curvature is known as crown curvature. Width curvature is known as camber or cross curvature. The proper setting and control of length and width curvature improves flying height variability over varying conditions, improves wear on the slider and the disc surface, and improves take-off performance by reducing stiction between the slider and the disc surface.

In a typical slider fabrication process, length or width curvature is created by lapping the bearing surface on a cylindrically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. More efficient and controllable methods of effecting air bearing surface curvature are desired.

SUMMARY OF THE INVENTION

A disc is used for recording information in a disc drive. The disc includes a data storage surface defined by a periphery. The data storage surface is curved to reduce stiction and improve slider dynamics.

DETAILED DESCRIPTION OF THE PREFERRED EMBODIMENTS

Figure 1:
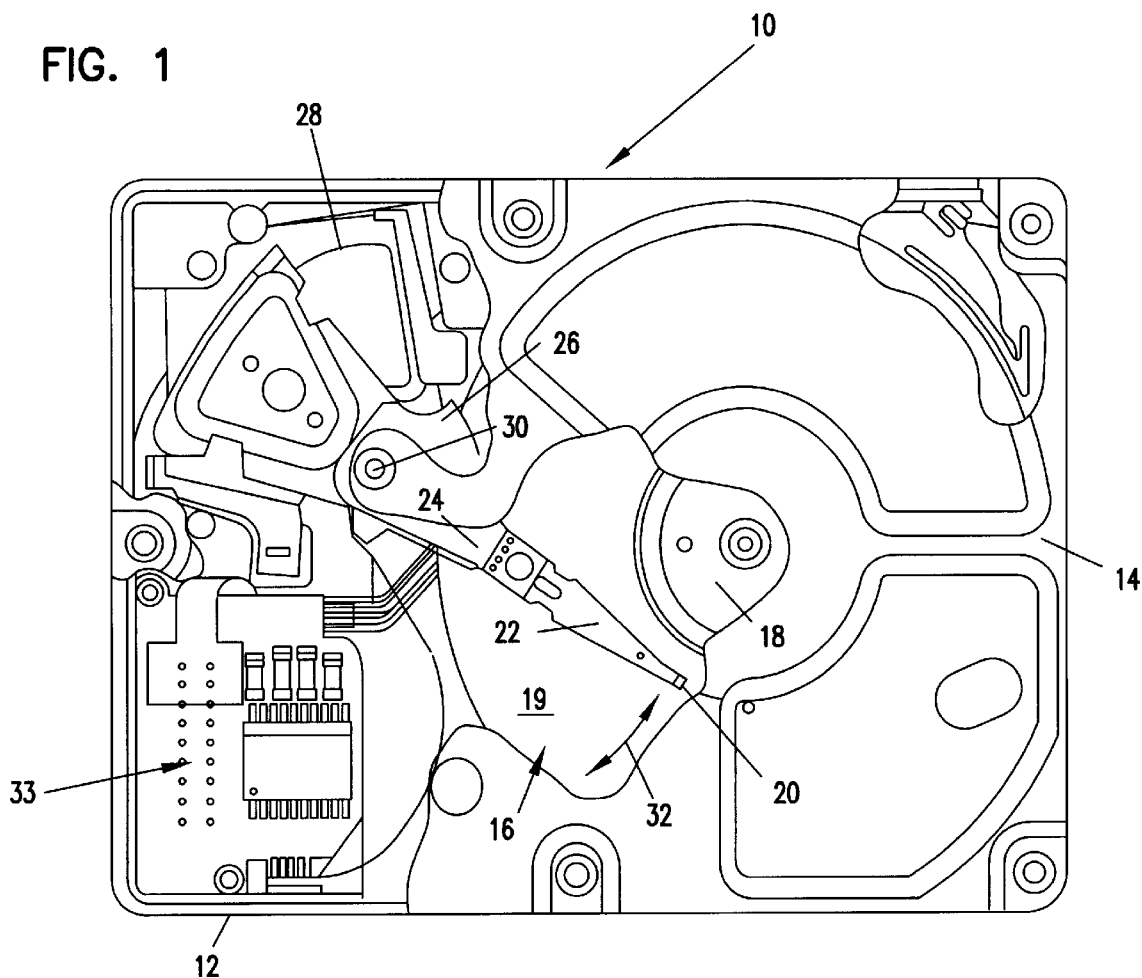
FIG. 1 is a plan view of a typical disc drive in which a disc fabricated according to the present invention can be used.

FIG. 1 is a plan view of a typical disc drive 10 in which a disc formed according to the present invention can be used. Disc drive 10 includes a housing with a base 12 and a top cover 14 (portions of top cover 14 are removed for clarity). Disc 10 further includes a disc pack 16 which is mounted on a spindle motor (which is not shown) by a disc clamp 18. Disc pack 16 includes a plurality of individual discs 19 which are mounted or co-rotation about a central axis. Each disc surface has an associated head gimbal assembly (HGA) 20 which is mounted to disc drive 10 for communicating with a disc surface.

In the example shown in FIG. 1, HGAs 20 are supported by load beam flexures 22 which are, in turn, attached to track accessing arms 24 of an actuator 26. The actuator shown in FIG. 1 is the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path generally illustrated by number 32 under the control of electronic circuitry 33. In order to perform a track seek operation, voice coil motor 20 rotates actuator 26 such that its attached heads 20 are positioned above a desired track on the surfaces of discs 19. In order to perform a track following operation, voice coil motor 28 holds actuator 26 in a desired position, such that heads 20 are held above the desired track on surfaces of discs 19.

Figure 2:
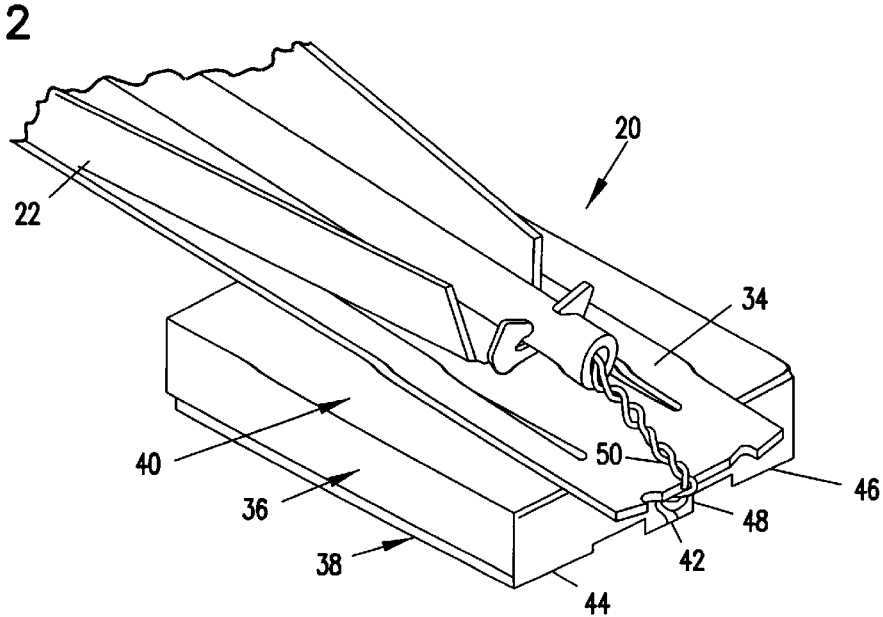
FIG. 2 is a perspective view of a head gimbal assembly supported by a load beam flexure.

FIG. 2 shows head gimbal assembly 20 in greater detail. Load beam 22 provides a preload force which urges head gimbal assembly 20 toward the disc surface. Assembly 20 includes a gimbal 34 and a slider 36. Gimbal 34 is positioned between slider 36 and load beam 22 to provide a resilient connection that allows the slider to follow the topography of the disc surface. Slider 36 includes air bearing surface 38, back surface 40 and transducer 42. Air bearing surface 38, in one embodiment, includes first and second raised side rails 44 and 46 and raised center pad 48. Transducer 42 is fabricated on a trailing end of center pad 48. Transducer 42 is electrically coupled to leads 50 and communicates with individual bit positions on the surface of disc 19 as they pass beneath slider 36. Transducer 42 can include a thin film or magnetoresistive magnetic head, or a magneto-optic head, for example.

Figure 3:
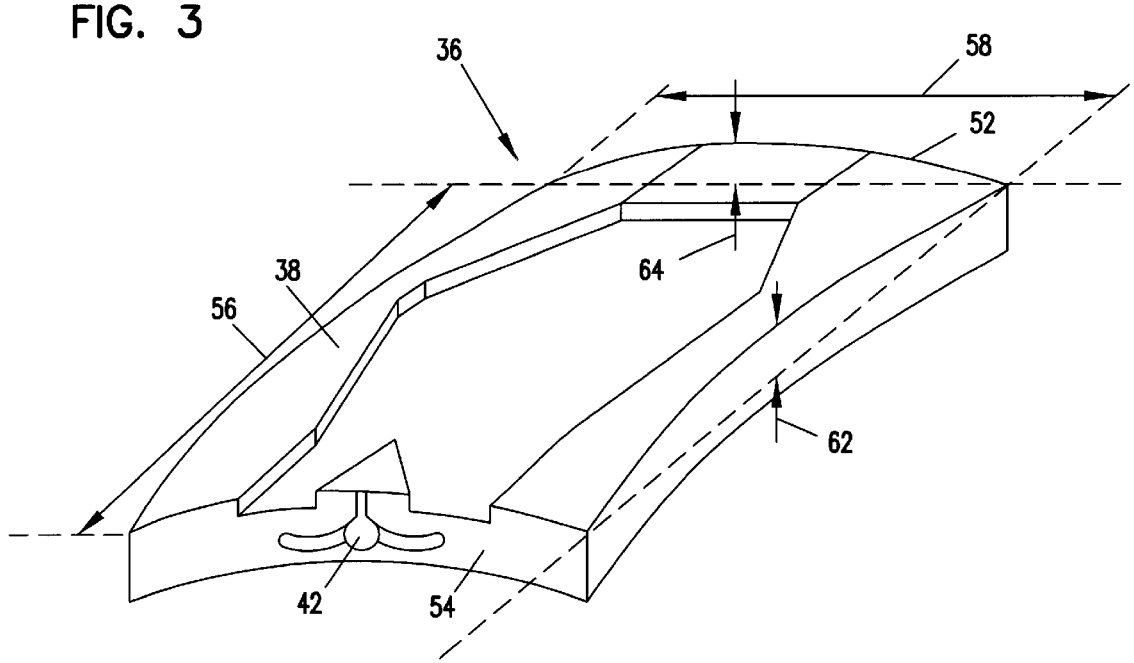
FIG. 3 is a perspective view of a slider having a bearing surface with length and width curvature.

FIG. 3 is a perspective view of slider 36, as viewed from bearing surface 38. Slider 36 has a leading surface 52, a trailing surface 54, a length 56 and a width 58. In one embodiment, slider 36 has a positive curvature along its length 56 and along its width 58. With positive curvature, air bearing surface 38 has an overall convex shape. A common measurement of the length curvature and the width curvature is the difference between the highest point along the length and width and the lowest point along the length and width, respectively. The height difference along the length curvature (referred to as crown height) is shown at 62. The height difference along the width curvature (referred to as cross height) is shown at 64. Typical crown and cross heights are on the order of 0 to 1.5 microinches for a "30 series" slider having a length of 49 mils and a width of 39 mils. The length curvature and width curvature are typically formed during fabrication of the slider body.

The surfaces of conventional discs 19, in an embodiment in which discs 19 comprise thin film recording media, are made extremely smooth and flat. For example, typical disc surfaces may have a roughness average (RA) less than 10 Å and a total runout (TIR) less than 15 micrometers. The primary reason that the disc surfaces are made so smooth and flat is to allow the slider and transducer to fly safely at extremely low altitudes. The reason that the slider is manufactured with a built-in intrinsic curvature (the crown and cross curvature) is to allow the slider to take-off early upon rotation of the disc surface. This reduces wear. The curvature on the slider also offers less area of contact with the disc. This is an advantage in that it lowers stiction. Also, the crown enables the slider to have a more stable fly height. However, the process of manufacturing the crown and cross curvature is quite costly and is not easily controllable.

The present invention introduces a well controlled out-of-flatness characteristic to the disc structure. In one preferred embodiment, the out-of-flatness characteristic introduces a curvature on the disc which is sufficient, relative to the surface of the slider facing the disc, that it either enhances or emulates slider crown, cross curvature, or both.

Figure 4:
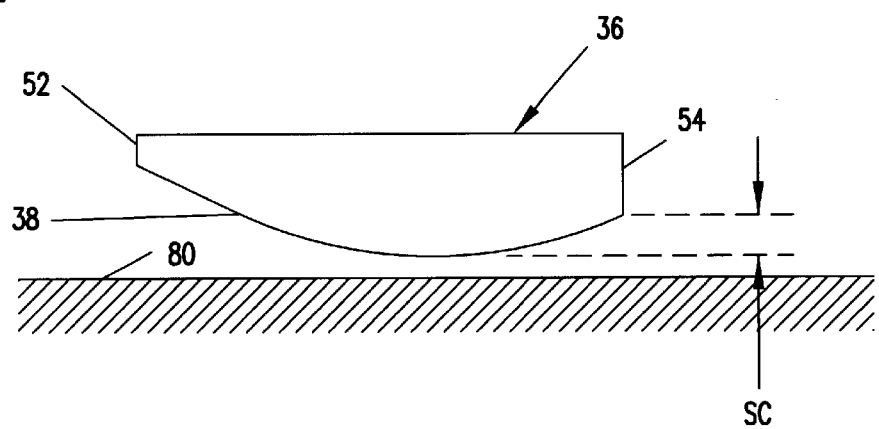
FIG. 4 illustrates the slider shown in FIG. 3 disposed above the surface of a disc.

FIG. 4 illustrates air bearing surface 38, of slider 36, disposed in relation to a flat disc surface 80. The slider crown, designated SC in FIG. 4, is typically approximately 0.3–1.1 microinches.

Figure 5:
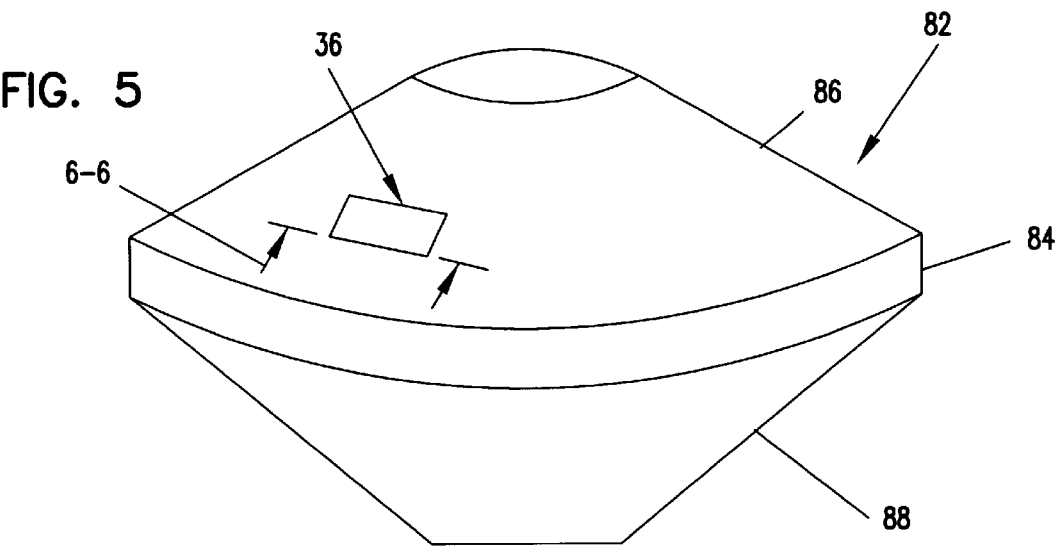
FIG. 5 illustrates one embodiment of a disc formed in accordance with the present invention.

FIG. 5 illustrates a disc 82 with a periphery 84 and first and second surfaces 86 and 88, respectively. Surfaces 86 and 88 define a geometric configuration such that the area under a slider, such as slider 36, travelling over disc surface 86, is curved. Surfaces 86 and 88 are slightly conical in shape, which shape is purposely introduced during manufacturing. Thus, each surface 86 and 88 offers a convex curvature to air bearing surface 38 of slider 36. In the embodiment illustrated in FIG. 5, surfaces 86 and 88 are each provided with a built-in circumferential curvature such that they obtain a generally truncated cone shape. Of course, in FIG. 5, the vertical axis of the disc is grossly enhanced for the sake of clarity.

Figure 6:
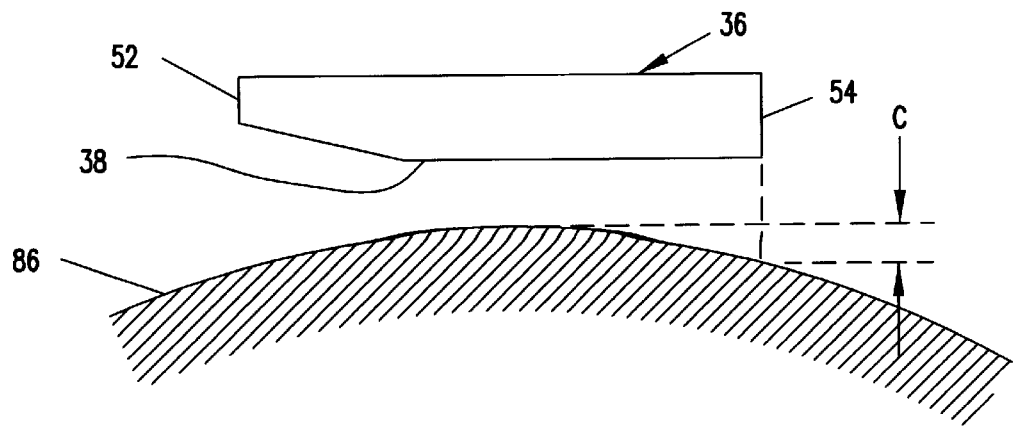
FIG. 6 illustrates a slider positioned above the disc illustrated in FIG. 5.

FIG. 6 is a partial sectional view of disc surface 86 and slider 36 taken along section lines 6—6 in FIG. 5. FIG. 6 illustrates that, even where slider 36 has a substantially flat air bearing surface 38, similar slider characteristics can be achieved as if slider 36 had a crown. That is because disc surface 86 is crowned relative to air bearing surface 38. The crown C illustrated in FIG. 6 is measured as the height from the top of disc surface 86 (closest to air bearing surface 38) to the portion of disc surface 36 located furthest from air bearing surface 38 along the longitudinal length of slider 36. Of course, if air bearing surface 38 also contains a crown, the crown on air bearing surface 38 and disc crown C augment one another.

A geometric analysis of the arrangement illustrated in FIG. 6 demonstrates that the disc crown C under slider 36, where air bearing surface 38 has a slider rail length 1 and is located at a radial position r over disc surface 86, and wherein the inner-outer radius distance of disc surface 86 is given by L, and the out-of-flatness value for surface 86 is given by W, then the disc crown C can be calculated as follows:

$$C = \frac{Wl^2}{8rL} \quad \text{Equation 1}$$

For typical values of slider rail length l (which are approximately 2 mm), disc inner-outer radius distance L (which is typically 35 mm for 95 mm diameter), and slider radius position r (say 20 mm), one finds that C is approximately equal to 0.028 W, with C given in microinches and W in micrometers. In other words, for out-of-flatness values in a range of approximately 10–40 micrometers, a disc crown would be approximately equivalent to the range of current slider crowns (approximately equal to 0.3–1.1 microinches). This can be accomplished without undergoing the expensive and difficult process of introducing crown into the air bearing surface.

In addition, from Equation 1, it can be seen that the disc crown underneath the air bearing surface has an inverse relation to the radial position of the slider over the disc. This allows compensation for the increase in linear velocity experienced by the air bearing surface at the outer radius of the disc surface. In other words, for a given RPM, the linear velocity at the outer radius of the disc is higher than that at the inner radius of the disc. This often results in the slider flying higher at the outer radii than at the inner radii. However, with the disc having a lower effective crown at the outer radius, this tends to decrease fly height, thus offsetting, at least to some degree, the increased linear velocity experienced by the slider.

Figure 7:
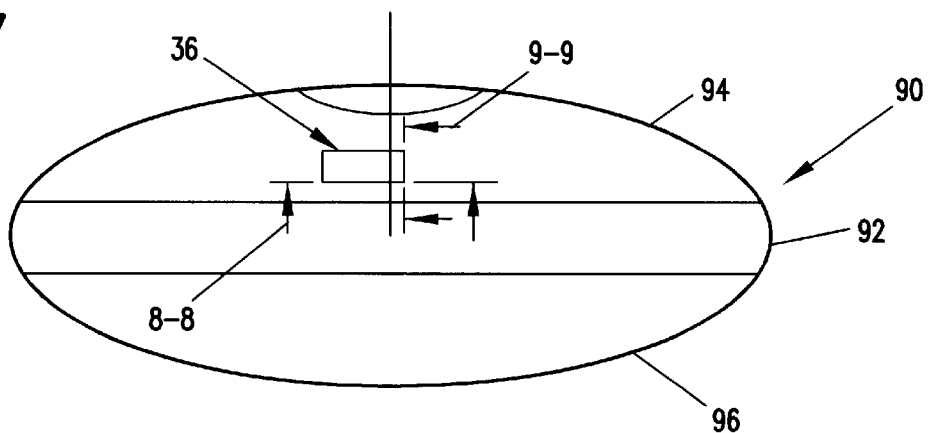
FIG. 7 illustrates another embodiment of a disc formed in accordance with one aspect of the present invention.
Figure 8:
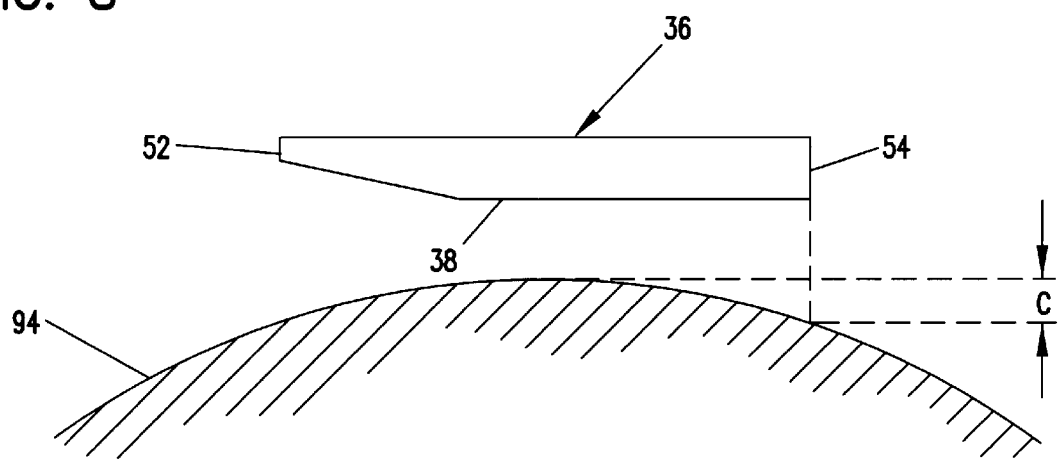
FIG. 8 illustrates a slider disposed above the disc illustrated in FIG. 7.

FIG. 7 illustrates another disc 90 in accordance with another aspect of the present invention. Disc 90 includes periphery 92 and first and second data storage surfaces 94 and 96. As with disc 82 illustrated in FIG. 5, surfaces 94 and 96 of disc 90 are also curved relative to the air bearing surface of slider 36. However, rather than surfaces 94 and 96 simply having a built-in circumferential curvature (as do surface 86 and 88 of disc 82) surfaces 94 and 96 have both a circumferential curvature and a radial curvature. This presents a curvature relative to two axes of the air bearing surface of slider 36. As with the circumferential curvature introduced into the surfaces of disc 82, the circumferential curvature on surfaces 94 and 96 of disc 90 introduces a disc crown which enhances or emulates the crown previously introduced on the air bearing surface of slider 36. This is illustrated in FIG. 8. It will be noted that FIG. 8 is similar to FIG. 6, and the disc crown is calculated in the same way.

Figure 9:
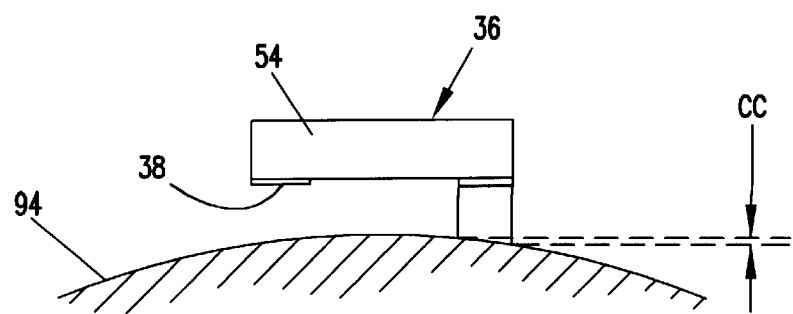
FIG. 9 illustrates an end view of the slider shown in FIG. 8, disposed above the disc illustrated in FIG. 7.

However, disc 90 also has a radial curvature which enhances or emulates the cross curvature (also referred to as camber) previously introduced on the air bearing surface of slider 36. FIG. 9 is an end view of a portion of slider 36 and disc 90 illustrated in FIG. 7, taken from the trailing edge of slider 36 along lines 9—9 in FIG. 7. FIG. 9 illustrates that disc surface 94 also presents a cross curvature CC to the air bearing surface 38 of slider 36. The cross curvature on disc surface 94 can thus be used instead of the cross curvature or camber previously formed on the air bearing surface 38 of slider 36.

The curvatures of the disc surfaces described herein are preferably formed on the discs during manufacture of the discs. For example, magnetic disc substrates are typically subjected to grinding and polishing processes during manufacturing. In one preferred embodiment, the curvature of the disc surfaces is formed during either the grinding or polishing processes.

Further, in some instances, discs in magneto-optic disc drives are formed of plastic material which is injection molded. Thus, the curvature on the disc surfaces is, in such discs, preferably formed during the molding process.

It should also be noted that, while only the disc is illustrated as being curved in a number of the above-described figures, both the disc and the air bearing surface can be curved in one illustrative embodiment. In that embodiment, the total curvature at the slider-disc interface is that of both the slider curvature and the disc curvature. These two values can be optimized according to any desired parameters.

Further, while the preceeding discussion describes disc crown and cross curvature (i.e., circumferential and radial curvature of the disc surface) other more complex shapes can also be used. For instance, the disc topography can be modified to accommodate twisting of the slider, or other parameters. Also, while a slider has only been shown positioned relative to a single disc surface in a number of the above-described drawings, it should be noted that the present invention can be implemented on more than one disc in a disc pack, and sliders can be positioned to access information on both surfaces of each disc, as well.

Although the present invention has been described with reference to preferred embodiments, workers skilled in the art will recognize that changes may be made in form and detail without departing from the spirit and scope of the invention.

What is claimed is:

1. A disc for recording information indicative of a signal from a head connected to a slider having an air bearing surface in a disc drive, the disc comprising:

a disc substrate; and surface means, disposed on the disc substrate, for storing information and providing a curved contour relative to the air bearing surface to emulate slider crown in a range of approximately 0.3–1.1 microinches and cross curvature.

2. A disc for recording information indicative of a signal from a head connected to a slider having an air bearing surface in a disc drive, the disc comprising:

a data storage surface defined by a periphery, the data storage surface being curved relative to the air bearing surface to emulate slider crown in a range of approximately 0.3–1.1 microinches.

3. The disc of claim 2 wherein the data storage surface is curved according to a circumferential crown.

4. The disc of claim 3 wherein the data storage surface includes a curvature that emulates a cross curve on the air bearing surface in a desired range.

5. The disc of claim 2 wherein the data storage surface generally forms a truncated cone shape.

6. The disc of claim 2 further including a disc substrate supporting the data storage surface, the substrate being subjected to grinding during formation thereof and wherein the crown in the data storage surface is formed during grinding.

7. The disc of claim 2 further including a disc substrate supporting the data storage surface, the disc substrate being subjected to polishing during formation thereof and wherein the crown is formed during polishing.

8. The disc of claim 2 wherein the disc is formed by molding and wherein the crown in the data storage surface is formed when the disc is molded.

9. A disc drive, comprising:

a slider having an air bearing surface;

a transducer carried by the slider; and a disc, rotatable relative to the slider and having a disc surface, the transducer being positioned to access data on the disc surface during rotation of the disc, the disc surface being curved relative to the air bearing surface to emulate a crown on the air bearing surface in a range of approximately 0.3–1.1 microinches.

10. The disc drive of claim 9 wherein the bearing surface has a length l and is located at a radial position r above the disc surface and wherein the disc surface has an inner radius to outer radius distance L and an out of flatness measure W and wherein the crown c is represented by:

$$C = \frac{Wl^2}{8rL}.$$

11. The disc drive of claim 9 wherein the crown comprises a circumferential crown.

12. The disc drive of claim 11 wherein the crown includes a radial curvature.

13. The disc drive of claim 9 wherein the disc surface generally forms a truncated cone shape.

14. The disc drive of claim 9 wherein the air bearing surface is substantially uncrowned.

15. A disc drive including:

a slider having an air bearing surface that is substantially uncrowned; and a data storage disc configured to store data accessible by a transducer carried by the slider, the data storage disc comprising:

a disc substrate with a data storage surface thereon, the substrate being curved such that the data storage surface is more closely located to the air bearing surface at a central region of the air bearing surface that at a peripheral edge of the air bearing surface as the air bearing surface flies above the data storage surface to approximate a crown on the air bearing surface in a range of approximately 0.3–1.1 microinches.

16. The data storage disc of claim 15 wherein the disc substrate is curved such that the data storage surface is located more closely to the central region of the air bearing surface than to a pair of oppositely disposed peripheral edges of the air bearing surface.

17. The data storage disc of claim 15 wherein the disc substrate is curved such that the data storage surface is located more closely to the central region of the air bearing surface than to any peripheral edges of the air bearing surface.

18. The data storage disc of claim 15 wherein the disc substrate is crowned.

* * * * *